US012304812B2

(12) United States Patent
Deng et al.

(10) Patent No.: US 12,304,812 B2
(45) Date of Patent: May 20, 2025

(54) ORDERED CROSS-STACKED METAL OXIDE NANOWIRE ARRAY MATERIAL AND PREPARATION METHOD THEREOF

(71) Applicant: FUDAN UNIVERSITY, Shanghai (CN)

(72) Inventors: Yonghui Deng, Shanghai (CN); Yuan Ren, Shanghai (CN); Yidong Zou, Shanghai (CN)

(73) Assignee: FUDAN UNIVERSITY, Shanghai (CN)

( * ) Notice: Subject to any disclaimer, the term of this patent is extended or adjusted under 35 U.S.C. 154(b) by 770 days.

(21) Appl. No.: 17/603,597

(22) PCT Filed: Mar. 9, 2020

(86) PCT No.: PCT/CN2020/078363
§ 371 (c)(1),
(2) Date: Oct. 14, 2021

(87) PCT Pub. No.: WO2020/228401
PCT Pub. Date: Nov. 19, 2020

(65) Prior Publication Data
US 2022/0194793 A1    Jun. 23, 2022

(30) Foreign Application Priority Data

May 11, 2019 (CN) .......................... 201910391024.7

(51) Int. Cl.
*C01B 13/18* (2006.01)
*B82Y 40/00* (2011.01)
(Continued)

(52) U.S. Cl.
CPC ............ *C01B 13/185* (2013.01); *C01G 39/02* (2013.01); *C01G 41/006* (2013.01); *B82Y 40/00* (2013.01); *C01P 2004/16* (2013.01)

(58) Field of Classification Search
CPC .............................. C01B 13/185; B82Y 40/00
See application file for complete search history.

(56) References Cited

FOREIGN PATENT DOCUMENTS

| CN | 101153051 A | 4/2008 |
|----|-------------|--------|
| CN | 101823706 A | 9/2010 |

(Continued)

OTHER PUBLICATIONS

Machine translation of CN-105129856-A (Year: 2015).*
(Continued)

*Primary Examiner* — Paul A Wartalowicz
*Assistant Examiner* — Logan Edward Laclair
(74) *Attorney, Agent, or Firm* — Bayramoglu Law Offices LLC

(57) ABSTRACT

A method for preparing an ordered cross-stacked metal oxide nanowire array is provided. The method includes the following steps: conducting synthesis by using an amphiphilic diblock copolymer as a structure directing agent, tetrahydrofuran (THF) as a solvent and polyoxometalates (POMs) as an inorganic precursor, where the diblock copolymer can interact with POMs via an electrostatic force to form a core-shell cylindrical micelle in the solvent, which self-assembles to form an ordered multilayer-crossed organic-inorganic composite nanostructure during an evaporation process; the template is removed by calcination in air, thereby obtaining ordered and crossed metal oxide nanowires with various elements doping. The nanowire array material has a high specific surface area, a high crystallinity, and realizes uniform doping of heteroatoms.

4 Claims, 1 Drawing Sheet

(51) Int. Cl.
*C01G 39/02* (2006.01)
*C01G 41/00* (2006.01)

(56) References Cited

FOREIGN PATENT DOCUMENTS

| CN | 102173390 A | | 9/2011 |
|---|---|---|---|
| CN | 104229862 A | | 12/2014 |
| CN | 105129856 A | * | 12/2015 |
| CN | 110127620 A | | 8/2019 |
| WO | 2011037388 A2 | | 3/2011 |

OTHER PUBLICATIONS

Zhang et al (Inorganic-Macroion-Induced Formation of Bicontinuous Block Co-polymer Nanocomposites with Enhanced Conductivity and Modulus, Communications, 2017) (Year: 2017).*

Yuan Ren, et al., Ordered mesoporous metal oxides: synthesis and applications, Chem. Soc. Rev., 2012, pp. 4909-4927, 41.

Kiyoung Lee, et al., One-Dimensional Titanium Dioxide Nanomaterials: Nanotubes, Chem. Rev., 2014, pp. 9385-9454, 114.

Younan Xia, et al., One-Dimensional Nanostructures: Synthesis, Characterization, and Applications, Adv. Mater., 2003, pp. 353-389, 15 No. 5.

Rupesh S. Devan, et al., One-Dimensional Metal-Oxide Nanostructures: Recent Developments in Synthesis, Characterization, and Applications Adv. Funct. Mater., 2012, pp. 3326-3370, 22.

Neil P. Dasgupta et al., 25th Anniversary Article: Semiconductor Nanowires—Synthesis, Characterization, and Applications, Adv. Mater., 2014, pp. 2137-2184, 26.

Fudong Wang, et al., Solution-Liquid-Solid Synthesis, Properties, and Applications of One-Dimensional Colloidal Semiconductor Nanorods and Nanowires, Chem. Rev., 2016, p. 10888-10933, 116.

Henry D. Tran, et al., One-Dimensional Conducting Polymer Nanostructures: Bulk Synthesis and Applications, Adv. Mater., 2009, 1487-1499, 21.

Gregory S. Doerk, et al., Enabling complex nanoscale pattern customization using directed self-assembly, Nat. Commun., 2014, pp. 1-8, 5:5805.

Jong Min Kim, et al., Block Copolymer with an Extremely High Block-to-Block Interaction for a Significant Reduction of Line-Edge Fluctuations in Self-Assembled Patterns, Chem. Mater., 2016, pp. 5680-5688, 28.

Shisheng Xiong, et al., Directed Self-Assembly of Triblock Copolymer on Chemical Patterns for Sub-10-nm Nanofabrication via Solvent Annealing, ACS Nano, 2016, pp. 7855-7865, 10.

Wei Wei, et al., Synthesis of Molybdenum Disulfide Nanowire Arrays Using a Block Copolymer Template, Chem. Mater., 2016, pp. 4017-4023, 28.

Jae Won Jeong, et al., Nanotransfer Printing with sub-10 nm Resolution Realized using Directed Self-Assembly, Adv. Mater., 2012, pp. 3526-3531, 24.

Jae Won Jeong, et al., High-resolution nanotransfer printing applicable to diverse surfaces via interface-targeted adhesion switching, Nat. Commun., 2014, 5,5387.

Jae Won Jeong, et al., 3D Cross-Point Plasmonic Nanoarchitectures Containing Dense and Regular Hot Spots for Surface-Enhanced Raman Spectroscopy Analysis, Adv. Mater., 2016, pp. 8695-8704, 28.

Wu Qingqing, et al., Preparation of Platinum Nanowires by Polystyrene-Poly (ethylene oxide) Diblock Copolymer Template Method, Chinese Journal of inorganic Analytical Chemistry, 2017, pp. 75-78, vol. 7, No. 1.

Juan Peng, et al. Two-Dimensional Arrays of Strings of TiO2 Nanoparticles via Cooperative Block Copolymer Self-Assembly, Chem. Mater., 2008, pp. 100-1202, vol. 20.

Juan Peng, et al. From Nanodot to Nanowire: Hybrid Au/Titania Nanoarrays by Block Copolymer Templates, Macromolecular Rapid Communications, 2009, pp. 1857-1861, vol. 30.

Santosh Pabba, et al. Oriented Nanomaterial Air Bridges Formed from Suspended Polymer-Composite Nanofibers, ACS Nano, 2007, pp. 57-62, vol. 1, No. 1.

* cited by examiner

ORDERED CROSS-STACKED METAL OXIDE NANOWIRE ARRAY MATERIAL AND PREPARATION METHOD THEREOF

CROSS REFERENCE TO THE RELATED APPLICATIONS

This application is the national stage entry of International Application No. PCT/CN2020/078363, filed on Mar. 9, 2020, which is based upon and claims priority to Chinese Patent Application No. 201910391024.7 filed on May 11, 2019, the entire contents of which are incorporated herein by reference.

TECHNICAL FIELD

The present disclosure belongs to the technical field of semiconductor nanomaterials, and specifically relates to a preparation method for ordered cross-stacked metal oxide nanowire array materials.

BACKGROUND

In recent years, metal oxide nanomaterials and composites thereof have been widely used in photocatalysis, gas sensor, energy storage and conversion and other fields, and have received extensive attention from the scientific community (Ren, Y et al. Chem. Soc. Rev. 2012, 41, 4909-4927; Lee, K. et al. Chem. Rev. 2014, 114, 9385-9454). One-dimensional (1D) metal oxide semiconductor nanomaterials (nanowires, nanorods, nanoribbons, nanotubes, etc.) have unique physicochemical properties due to their novel 1D nano-morphology and unimpeded electronic channels (Xia, Y N. et al. Adv. Mater 2003, 15, 353-389; Devan, R S. et al. Adv. Funct. Mater. 2012, 22, 3326-3370; Dasgupta, N P. et al. Adv. Mater. 2014, 26, 2137-2184; Wang, F D. et al. Chem. Rev. 2016, 116, 10888-10933.). In the past few decades, 1D metal oxide nanomaterials were mainly synthesized by hydrothermal/solvothermal methods, chemical vapor deposition (CVD), anodizing and other methods (Tran, H D. et al. Adv. Mater. 2009, 21, 1487-1499; Lee, K. et al. Chem. Rev. 2014, 114, 9385-9454.). Directed self-assembly (DSA) technology is an emerging method for synthesizing ordered nanowire arrays. DSA utilizes the controllable self-assembly behavior of the block copolymer to realize the manufacture of the ordered nano-pattern with a specific size (Doerk, G S. et al. Nat. Commun. 2014, 5, 5805; Kim, J M. et al. Chem. Mater. 2016, 28, 5680-5688; Xiong, S S. et al. ACS Nano. 2016, 10, 7855-7865; Wei, W. et al. Chem. Mater. 2016, 28, 4017-4023.). However, this method has the following problems: the DSA technology can only synthesize amorphous framework materials such as macromolecular polymers and silica, and the synthesis of metal oxide nanowire array requires complicated operations such as post-modification of the inorganic precursor. For multilayer-crossed nanowire arrays (i.e. "nano meshes"), it needs repeated operations of the "transfer printing" technology (Jeong, J W. et al. Adv. Mater. 2012, 24, 3526-3531; Jeong, J W. et al. Nat. Commun. 2014, 5, 5387; Jeong, J W et al. Adv. Mater. 2016, 28, 8695-8704.). These problems greatly hinder the application of the DSA technology in scale-up production. Therefore, it is of great significance to develop a simple and convenient one-step method for directly synthesizing multi layer-crossed metal oxide nanowire array.

SUMMARY

An objective of the present disclosure is to provide a method for preparing an ordered cross-stacked metal oxide nanowire array. The present disclosure is straightforward operation, convenient control and easy to repeat.

The present disclosure provides a method for preparing an ordered cross-stacked metal oxide nanowire array material. The method includes: synthesizing crossed-stacked metal oxide nanowire by using an amphiphilic diblock copolymer (PEO-b-PS) with an ultra-high molecular weight as a template and commercial polyoxometalates (POMs) as an inorganic precursor; forming a core-shell cylindrical micelle through an electrostatic force between hydrophilic block (PEO) and polyoxometalates anion (such as $SiW_{12}O_{40}^{4-}$, $PW_{12}O_{40}^{3-}$, $SiMO_{12}O_{40}^{4-}$ or $PMO_{12}O_{40}^{3-}$), and obtaining an ordered mesoscopic organic-inorganic composite structure by evaporation-induced self-assembly (EISA); and removing the template through a guiding effect of the template and calcination-induced structural transformation to obtain an ordered metal oxide semiconductor nanowire material with a high crystallinity. A variety of metal oxide nanowire materials such as $Si-WO_3$, $P-WO_3$, $Si-MoO_3$ and $P-MoO_3$ are synthesized by controlling the type of the inorganic precursor (POMs). A spacing of the nanowire array and a diameter of the nanowire are effectively controlled by adjusting the molecular weight of the PEO block and the PS block of the diblock copolymer. The spacing of the ordered nanowire array material is controlled within 20-40 nm, and the diameter of the nanowire is controlled within 10-20 nm. The method specifically includes the following steps:

(1) dissolving the PEO-b-PS with a high molecular weight ($M_n$=15,000-35,000 g·mol$^{-1}$) in the solvent, and stirring thoroughly to obtain a transparent solution, denoted as solution A with a concentration of 1-5 wt %; adding a POMs hydrate (such as $H_4SiW_{12}O_{40}·xH_2O$) into the solvent to obtain a transparent solution, denoted as solution B with a concentration of 5-10 wt %; mixing the solution A and the solution B by stirring thoroughly to obtain a transparent colloidal solution;

(2) transferring the colloidal solution into a petri dish to evaporate at room temperature for 2-12 h; transferring the petri dish to an oven to curing at 70-100° C. for 12-48 h to obtain a transparent organic-inorganic composite film, scraping the composite film from the petri dish, and grinding to obtain a powder;

(3) placing the powder in a tube furnace, and calcinating in nitrogen for 1-2 h by heating up to 350-500° C. at a rate of 1-3° C./min; and then calcinating in air at 400-450° C. for 0.5-1 h to remove carbon, thereby obtaining crystallined cross-stacked metal oxide nanowire materials.

In step (1), the solvent may be adopted one or more of the group consisting of tetrahydrofuran (THF), toluene, chloroform and dimethylformamide. In the amphiphilic diblock copolymer, the molecular weight of the PEO block may be 2,000-5,000 g/mol, and the molecular weight of the PS block may be 10,000-30,000 g/mol. The POMs may be used one or more of the group consisting of silicotungstic acid, phosphotungstic acid, silicomolybdic acid and phosphomolybdic acid.

In the present disclosure, an array spacing and a nanowire diameter of the synthesized nanowire materials may be controlled by changing the length of the PS block and the PEO block of the diblock copolymer, respectively.

In the present disclosure, various metal oxide nanowire materials (such as $Si-WO_3$, $P-WO_3$, $Si-MoO_3$ and $P-MoO_3$), composed of different elements, with high crystallinity and high specific surface area, or bimetal or multimetal composite oxides may be synthesized by using different POMs hydrates as inorganic precursors. The all required POMs are commercial reagents, which are convenient and easy to obtain.

In the present disclosure, the method of evaporation-induced self-assembly (EISA) combined with roasting crystallization has desirable universality. Any methods for synthesizing a nonmaterial by EISA principle are applicable. The cross-stacked metal oxide nanowire materials may be synthesized by spin-coating, dip-coating, or directly leaving the solution open to evaporate.

In the present disclosure, the method of in-situ template carbonization for the synthesis of ordered mesoporous metal oxide material is universal. The PS block with $sp^2$-hybrid C=C is converted in situ into amorphous carbon as a rigid support for the metal oxide. It is then calcinated in air to remove the residual carbon, thereby obtaining a highly ordered metal oxide nanowire material with a high specific surface. Any method for synthesizing a mesoporous metal oxide material by self-assembly may apply.

In the present disclosure, the synthesized material has a unique "nanomesh" morphology. The orderly arranged metal oxide nanowires are parallel to the substrate, stacked layer by layer and crossed vertically to form a semiconductor nanomesh structure with a high active specific surface area. The crystallinity of the synthesized mesoporous material varies with the precursor used and the calcination temperature used.

The present disclosure is different from the traditional method of synthesizing the metal oxide nanowire array, but directly co-assembles the PEO-b-PS with the POMs. The protonated PEO block in the diblock copolymer can form a strong electrostatic force with the heteropoly acid anion (such as $SiW_{12}O_{40}^{4-}$) to form a uniform cylindrical composite micelle. In the subsequent evaporation process, it can self-assemble to form an ordered tnesoscopic structure. It is worth mentioning that during the subsequent heating and calcination to remove the polymer template and crystallize the framework (to thermally decompose and convert the heteropoly acid into the corresponding metal oxide), a process similar to "Ostwald ripening" will occur, and finally an ordered multilayer-crossed metal oxide (such as Si—$WO_3$) nanowire array will be obtained. The material has an open nano-framework, high specific surface area, high crystallinity and uniform non-metal heteroatom doping. The method has the advantages of simple operation, easy repeatability and easy control of conditions.

DETAILED DESCRIPTION OF THE EMBODIMENTS

Reagents

Figure 1A:
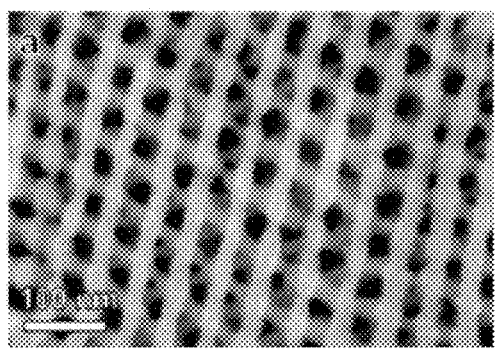
FIG. 1A is a field emission scanning electron microscopy (FESEM) image of ordered cross-stacked metal oxide nanowire materials, where the metal oxide is Si—$WO_3$.
Figure 1B:
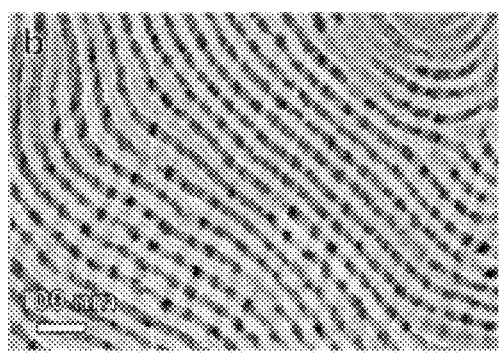
FIG. 1B is a FESEM image of ordered cross-stacked metal oxide nanowire materials, where the metal oxide is P—$WO_3$.
Figure 1C:
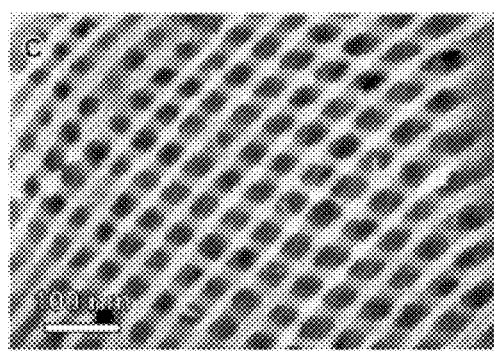
FIG. 1C is a FESEM image of ordered cross-stacked metal oxide nanowire materials, where the metal oxide is Si—$MoO_3$.
Figure 1D:
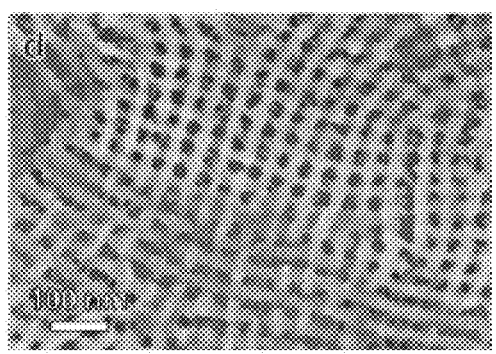
FIG. 1D is a FESEM image of ordered cross-stacked metal oxide nanowire materials, where the metal oxide is P—$MoO_3$.

Polyethylene oxide monomethyl ether (PEO, molecular weight 5,000 g/mol), 2-bromoisobutyryl bromide, N,N,N', N',N"-pentamethyldiethylene triamine (PMDETA) were purchased from Acros. PEO5000 was dehydrated in a vacuum oven at 30° C. for 24 h, and stored in a desiccator for later use.

Silicotungstic acid hydrate ($H_4SiW_{12}O_{40} \cdot xH_2O$), phosphotungstic acid hydrate ($H_3PW_{12}O_{40} \cdot xH_2O$), and phosphomolybdic acid hydrate ($H_3PMO_{12}O_{40} \cdot xH_2O$) were purchased from Aladdin. Silicomolybdic acid hydrate ($H_3PMO_{12}O_{40} \cdot xH_2O$) was purchased from Sigma-Aldrich.

Styrene (St), pyridine, tetrahydrofuran (THF), anhydrous ether, petroleum ether (b.p. 60-90° C.), cuprous bromide (CuBr) and neutral alumina (200 mesh) were all analytically pure and purchased from Shanghai Chemical Reagent Limited company.

The neutral alumina was activated at 120° C. for 2 h, and placed in a desiccator to cool for later use. The St was filtered through a neutral alumina column to remove a polymerization inhibitor and stored at −15° C. for later use. After the CuBr was purified by glacial acetic acid, it was protected from light and stored for later use.

Preparation

EXAMPLE 1

Synthesis of Ordered Cross-Stacked Si—$WO_3$ Nanowire Material (1) 0.10 g of PEO-b-PS ($M_n$=20,000 g·mol$^{-1}$) was dissolved in 5.0 mL of THF, and stirred to obtain a uniform solution A. 0.35 g of the silicotungstic acid hydrate ($H_4SiW_{12}O_{40} \cdot xH_2O$) was dissolved in 2.0 mL of THF, and stirred to obtain a uniform solution B. Solution A and solution B were stirred together to obtain a pale blue transparent colloidal solution.

(2) The solution was transferred to a petri dish to volatilize at room temperature for 2 h. Then the petri dish was transferred to an oven at 100° C. to further evaporate the solvent and solidify for 24 h to obtain a transparent composite film. The composite film was scraped from the petri dish to obtain a yellow powder.

(3) The newly obtained sample was placed in a tube furnace to calcinate in nitrogen at 500° C. for 1 h by heating up at a rate of 1.0° C./min. The sample was calcinated in air at 450° C. for 1 h to obtain yellow green Si—$WO_3$ nanowire material.

EXAMPLE 2

Synthesis of Ordered Cross-Stacked P—$WO_3$ Nanowire Material (1) 0.10 g of PEO-b-PS ($M_n$=21,000 g·mol$^{-1}$) was dissolved in 5.0 mL of THF, and stirred to obtain a uniform solution A. 0.30 g of the phosphotungstic acid hydrate ($H_3PW_{12}O_{40} \cdot xH_2O$) was dissolved in 2.0 mL of THF, and stirred to obtain a uniform solution B. Solution A and solution B were stirred together to obtain a pale blue transparent colloidal solution.

(2) The solution was transferred to a petri dish to volatilize at room temperature for 2 h. Then the petri dish was transferred to an oven at 100° C. to further evaporate the solvent and solidify for 48 h to obtain a transparent composite film. The composite film was scraped from the petri dish to obtain a yellow powder.

(3) The newly obtained sample was placed in a tube furnace to calcinate in nitrogen at 450° C. for 1 h by heating up at a rate of 1.0° C./min. The sample was calcinated in air at 450° C. for 30 min to obtain a yellow green P—$WO_3$ nanowire material.

EXAMPLE 3

Synthesis of Ordered Cross-Stacked Si—$MoO_3$ Nanowire Material (1) 0.10 g of PEO-b-PS ($M_n$=18,000 g·mol$^{-1}$) was dissolved in 5.0 mL of THF, and stirred to obtain a uniform solution A. 0.25 g of the siliconiolybdic acid hydrate ($H_4SiW_{12}O_{40}$·$xH_2O$) was dissolved in 2.0 mL of THF, and stirred to obtain a uniform solution B. Solution A and solution B were stirred together to obtain a yellow transparent colloidal solution.

(2) The solution was transferred to a petri dish to volatilize at room temperature for 1 h. Then the petri dish was transferred to an oven at 100° C. to further evaporate the solvent and solidify for 24 h to obtain a transparent composite film. The composite film was scraped from the petri dish to obtain a blue powder.

(3) The newly obtained sample was placed in a tube furnace to calcinate in nitrogen at 350° C. for 2 h by heating up at a rate of 1.0° C./min. The sample was calcinated in air at 400° C. for 30 min to obtain a blue green Si—$MoO_3$ nanowire material.

EXAMPLE 4

Synthesis of Ordered and Crossed P—$MoO_3$ Nanowire Material (1) 0.10 g of PEO-b-PS ($M_n$=19,000 g.mol$^{-1}$) was dissolved in 5.0 mL of THF, and stirred to obtain a uniform solution A. 0.20 g of the phosphoomolybdic acid hydrate ($H_3PMO_{12}O_{40}$·$xH_2O$) was dissolved in 2.0 mL of THF, and stirred to obtain a uniform solution B. Solution A and solution B were stirred together to obtain a yellow transparent colloidal solution.

(2) The solution was transferred to a petri dish to volatilize at room temperature for 1 h. Then the petri dish was transferred to an oven at 100° C. to further evaporate the solvent and solidify for 48 h to obtain a transparent composite film. The composite film was scraped from the petri dish to obtain a blue powder.

(3) The newly obtained sample was placed in a tube furnace to calcinate in nitrogen at 350° C. for 2 h by heating up at a rate of 1.0° C./min. The sample was calcinated in air at 400° C. for 30 min to obtain a blue green P—$MoO_3$ nanowire material.

What is claimed is:

1. A method for preparing an ordered cross-stacked metal oxide nanowire array, wherein a core-shell cylindrical micelle is formed through an electrostatic force between a hydrophilic block of an amphiphilic diblock copolymer template with a hydrophobic block having an ultra-high molecular weight and a polyoxometalates (POMs) anion, wherein the amphiphilic diblock copolymer template consists of polystyrene-block-poly(ethylene oxide) (PEO-b-PS), the hydrophilic block is a PEO block, the hydrophobic block is a PS block, and the POMs used is one or more selected from the group consisting of phosphotungstic acid, silicomolybdic acid and phosphomolybdic acid; an ordered mesoscopic organic-inorganic composite structure is obtained by evaporation-induced self-assembly (EISA), and an ordered metal oxide semiconductor nanowire material is obtained by carrying out calcination-induced structural transformation to remove the amphiphilic diblock copolymer template, wherein the method specifically comprises:
(1) dissolving the PEO-b-PS with a high molecular weight in a solvent, wherein the PEO-b-PS has a molecular weight $M_n$ of 15,000-35,000 g mol$^{-1}$, and stirring thoroughly to obtain a first transparent solution, with a concentration of PEO-b-PS of 1-5 wt %; adding a POMs hydrate to the solvent to obtain a second transparent solution, with a concentration of POM of 5-10 wt %; mixing the first transparent solution and the second transparent solution, and stirring thoroughly to obtain a transparent colloidal solution;
(2) transferring the colloidal solution to a petri dish to volatilize at room temperature for 2-12 h; transferring the petri dish to an oven to cure at 70-100° C. for 12-48 h to obtain a transparent organic-inorganic composite film, scraping the transparent organic-inorganic composite film from the petri dish, and grinding to obtain powder; and
(3) placing the powder in a tube furnace, and calcinating the powder in nitrogen for 1-2 h by heating up to 350-500° C. at a rate of 1-3° C./min to obtain a sample; calcinating the sample in air at 400-450° C. for 0.5-1 h, removing carbon therein to obtain a crystalline cross-stacked metal oxide nanowire material.

2. The method according to claim 1, wherein in step (1), the solvent used is one or more selected from the group consisting of tetrahydrofuran (THF), toluene, chloroform and dimethylformamide; a molecular weight of the PEO block of the amphiphilic diblock copolymer is 2,000-5,000 g/mol, and a molecular weight of the PS block is 10,000-30,000 g/mol.

3. The method according to claim 2, wherein an array spacing and a nanowire diameter of the crystalline crossed metal oxide nanowire material are controlled by changing the molecular weight of the PS block and the PEO block of the amphiphilic diblock copolymer, respectively.

4. The method according to claim 2, wherein metal oxide nanowire materials, composed of different elements, or bimetal or multi-metal composite oxide materials are synthesized by using different oxometallate hydrates as inorganic precursors.

* * * * *